United States Patent Office 3,021,289
Patented Feb. 13, 1962

3,021,289
PREPARATION OF POLYACETAL-POLYISOCYANATE POLYMERS
Erwin Müller, Leverkusen, Hans Holtschmidt, Koln-Stammheim, and Günther Braun, Leverkusen, Germany, assignors, by direct and mesne assignments, of one-half to Farbenfabriken Bayer Aktiengesellschaft, Leverkusen, Germany, a corporation of Germany, and one-half to Mobay Chemical Company, Pittsburgh, Pa., a corporation of Delaware
No Drawing. Filed Mar. 17, 1958, Ser. No. 721,656
Claims priority, application Germany Mar. 19, 1957
11 Claims. (Cl. 260—2.5)

This invention relates generally to synthetic polymeric materials and to methods of making such materials and more particularly to polyurethane plastics having improved physical characteristics and stability.

Polyurethane plastics of high molecular weight can be produced from polyisocyanates and polyhydroxy compounds having terminal hydroxyl groups. Hydroxyl terminated polyesters, hydroxyl terminated polyester amides, hydroxyl terminated polyethers, hydroxyl terminated polythioethers and the hydroxyl terminated hydrogenated copolymers of carbon monoxide and ethylene have been disclosed as compounds suitable for reacting with the polyisocyanates to form various types of plastic materials including foams and rubber-like materials. The resulting plastic materials are useful for making various foamed articles of manufacture, lacquers, adhesives, textile coatings, various types of elastomeric products and casting resins. Polyurethanes made from polyesters and isocyanates have been found particularly advantageous in commerce but they have the disadvantage of having ester groups within their structure which under some conditions may be saponified. Consequently, such polyurethanes may decompose to some extent if exposed to elevated temperatures or high humidity or if used for an extended period of time even under normal conditions. This decomposition is accompanied by unfavorable changes in the properties of the polyurethanes.

It is therefore an object of this invention to provide a novel plastic material formed by the reaction of a polyisocyanate with a polyhydroxy compound. Another object of the invention is to provide an improved polyurethane-type plastic that is resistant to saponification and a method for making the same. A more specific object of the invention is to provide an improved cellular polyurethane material.

The present application was copending with patent application Serial No. 616,629, now U.S. Patent 2,961,468, filed October 18, 1956, by Erwin Müller and Günther Braun, co-inventors of the instant invention, which described and claims a method for making a cellular polyurethane by a method wherein an organic polyisocyanate is reacted with a compound produced by the condensation of an aldehyde and a polyhydroxy compound. This condensation product contains an acetal grouping

—O—CHR—O— wherein R is a member selected from the group consisting of hydrogen, an aliphatic hydrocarbon radical and an aromatic hydrocarbon radical.

It has been found that a polyurethane having improved elasticity as well as excellent resistance to hydrolysis can be prepared from the polyhydroxy compound having the acetal grouping —O—CHR—O— provided a fatty acid ester containing at least two hydroxyl groups is included in the polyurethane.

A condensation product of the polyhydroxy compound, fatty acid ester and an aldehyde may be produced by any suitable conventional method for forming compounds of this type. Any suitable aldehyde may be used. Formaldehyde is preferred and it is preferably added as paraformaldehyde. If formaldehyde is condensed with a dihydric alcohol and a fatty acid ester containing at least two hydroxyl groups, an acetal having the grouping

is formed, whereas substituted acetals are formed if other aldehydes, such as, for example, acetaldehyde, benzaldehyde, crotonaldehyde, beta-ethyl-alpha-methyl acrolein and the like, are utilized. Such acetals have the grouping —O—CHR—O— in which the R represents a side group of an aliphatic or aromatic hydrocarbon radical which can be unsaturated and/or branched.

Any suitable polyhydroxy compound that will form an acetal with an aldehyde may be utilized in the condensation process with the aldehyde and fatty acid ester, but it is preferred to use a polyhydroxy compound that will not form cyclic acetals with the aldehyde. Examples of polyalcohols that are particularly advantageous in the condensation process ar hexanediol, butane-bis-beta-dihydroxyethylether, trimethylol propane, dihydroxy-ethylether, diethylene glycol, triethylene glycol and other polyethylene glycols, aromatic polyalcohols having aliphatically bonded hydroxyl groups, such as, for example, the product obtained by reacting an aromatic polyhydroxy compound with glycol chlorhydrin and the following aromatic-type compounds:

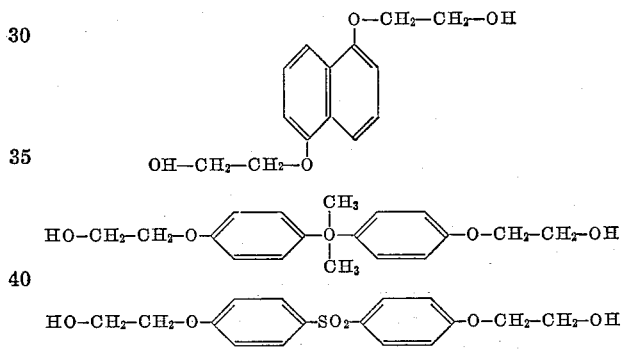

Low molecular weight hydroxyl polyesters, hydroxyl polyethers, hydroxyl polythioethers with a molecular weight up to about 400 or monomeric glycols containing carbamide and urethane groupings, such as, for example, adipic acid diethanolamide or hexamethylene-beta-dihydroxyethyl urethane, may also be utilized in forming the condensation product with the aldehyde and fatty acid ester and such a process and the product thereof are contemplated by the invention. Moreover, mixtures of the various polyhydroxy compounds enumerated herein may be reacted with the aldehyde to form suitable acetals. By avoiding polyhydroxy compounds that form cyclic acetals, polymers are obtained having the —O—CHR—O- linkage. Furthermore, mixtures of compounds having the acetal linkage with polyhydroxy compounds not having such a linkage may be used. These compounds may then be reacted with the fatty acid ester and polyisocyanate in an amount insufficient to react with all the available reactive hydrogen groups.

Any suitable fatty acid ester having at least two hydroxyl groups can be utilized in the condensation process to produce the novel organic compound having terminal hydroxyl groups adapted to be reacted with an organic polyisocyanate to form the improved polyurethane. Castor oil, hydrogenated castor oil, condensation products of ethylene oxide and castor oil, condensation products of hydrogenated castor oil and ethylene oxide, ricinoleic acid glycol esters, ricinoleic acid-5,18-octadecenediol monoesters, the reaction products of castor oil, oleic acid and phthalic acid with a glycol, and the like are examples of suitable fatty acid esters. Additional examples of suitable fatty acid esters include the monoglycerides of oleic acid, stearic acid and palmitic acid, the hydroxyl groups of which are reacted with alkylene oxide in order to avoid cyclic acetal formation. Moreover, the hydroxy-ethylated monoesters of oleic, stearic and palmitic acids wth trimethylol propane or pentaerythritol can also be used as fatty acid esters for the present process.

Fatty acid esters having at least two hydroxyl groups and a fatty acid radical of at least 10 carbon atoms are preferred for the process of this invention. The addition product of castor oil and an alkylene oxide having from 2 to 5 carbon atoms have been found particularly well suited for the purpose. The fatty acid esters are reacted with those polyhydroxy compounds having the grouping —O—CHR—O— and a molecular weight of at least 500 described in the aforesaid parent application and with organic polyisocyanates to form plastics of high molecular weight in accordance with the conventional process, such as set forth in the aforesaid application.

Any suitable polyisocyanate may be utilized, including hexamethylene diisocyanate, toluylene-2,4- and -2,6-diisocyanate, 1,5-naphthylene diisocyanate, diphenylmethane diisocyanate, dimeric diisocyanates, such as, for example, the following:

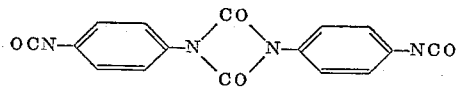

and the like. In addition, isocyanates in which the isocyanate group has been masked with a component which readily splits off, such as, for example, isocyanates masked with phenols, may be utilized. Such masked isocyanates, upon heating, are converted into compounds having the —NCO group by splitting off the phenol or other masking compound.

According to one particular embodiment of the present process, instead of a mixture of a polyhydroxy compound with —O—CHR—O— groups and fatty acid esters being used for the reaction with polyisocyanates, there are employed polyhydroxy compounds which have

—O—CHR—O— groups and which, from the time of their production, contain the fatty acid esters having at least two hydroxyl groups incorporated thereinto by condensation.

The production of these polyhydroxy compounds with —O—CHR—O— groups and modified with fatty acid esters is carried out in other respects entirely in the manner indicated in the copending Specification Serial No. 616,629, filed October 18, 1956, now U.S. Patent 2,961,468, from polyhydroxy compounds, aldehydes and fatty acid esters. The polyhydroxy compounds which can be condensed with the aldehyde to form acetal linkages may be polyalcohols, polyethers, such as, for example, polytetrahydrofurane, polythioethers and polyesters which compounds contain hydroxyl groups and are of low molecular weight with a molecular weight up to about 400.

It is preferred to use slightly more aldehyde than the theoretical amount in order to compensate for losses caused by vaporization during the condensation process. This is particularly true when the volatile aldehydes are utilized. Obviously, when a deficiency of aldehyde is present the size of the resulting molecule is less and the OH number is greater than when the theoretical amount of aldehyde is present to react with the polyhydroxy compound. In forming the condensation product, one molecule of aldehyde is used to link two molecules having terminal hydroxyl groups in forming each

grouping within the chain of the finished product. Therefore, if only two molecules of the terminal hydroxyl compound were to be linked, only one molecule of the aldehyde would be required, but as the chain becomes longer, the ratio of the aldehyde molecules to terminal hydroxyl compound molecules approaches 1:1.

The condensation of the polyalcohols and fatty acid esters with aldehydes can take place in known manner, either in the form of a melt or at the boiling temperature of a solvent in the presence of acid catalysts, such as, for example, p-toluenesulfonic acid. It is, however, preferred to work in the presence of solvents which, like benzene, toluene or chlorobenzene, remove azeotropically the water of condensation which is split off. Heating is carried out until no more water distills off.

The condensation product obtained from the reaction between the aldehyde and the polyhydroxy compound is a viscous oil. The condensate may be either linear or branched as pointed out hereinbefore. Divalent alcohol or a linear hydroxyl containing compound and formaldehyde produce linear condensates, whereas alcohols or fatty acid esters having more than two hydroxyl groups when reacted with formaldehyde produce branched polymers. As pointed out above, the size of the molecule and the hydroxyl number is dependent upon the molecular ratio of aldehyde to polyhydroxy compound.

As stated hereinbefore, the condensation product of the reaction between the aldehyde, a polyhydroxy compound having terminal hydroxyl groups and a fatty acid ester which contains at least two hydroxyl groups and is then reacted with a polyisocyanate to form a polyurethane plastic. The reaction may be conducted with more isocyanate than the theoretical amount required to react with the hydroxyl group. For example, an excess of diisocyanate may be reacted with a divalent or other polyvalent alcohol or with a low molecular weight polyester having the acetal linkages to produce a plastic having desirable characteristics for some purposes. The product obtained from the reaction of the excess of polyisocyanate with the compound having the hydroxyl groups and acetal linkage may also be reacted either simultaneously or in a subsequent reaction with water, a glycol, an amine or an aminoalcohol which acts as a cross-linking agent between the molecules of the isocyanate-modified polyhydroxy compound. If water is used as a cross-linking agent, a foam product of low specific gravity is obtained, whereas glycols and diamines produce rubber-like materials. The cross-linking reaction is preferably carried out in the presence of suitable reaction accelerators or catalysts, such as, for example, a tertiary amine which may be added per se to the mixture or may be incorporated in the condensation product before it is mixed with the cross-linking agent.

According to another embodiment of the invention it is also possible to use polyhydroxy compounds with chain-linking —O—CHR—O— groups, with which the fatty acid esters previously described are linked with the aid of a deficiency of polyisocyanates to the polyhydroxy compounds according to the copending specification Serial No. 616,629, filed October 18, 1956, now U.S. Patent 2,961,468, which discloses the production of the polyhydroxy compounds and the reaction with the polyisocyanate.

In order better to describe and further clarify the invention, the following are specific examples thereof:

Example 1

A mixture of 1.78 kg. of 1,4-butane-β-dihydroxyethyl ester, 920 g. of castor oil, 360 g. of paraformaldehyde and 8 g. of p-toluene sulphonic acid is heated while stirring to 80–90° C. After a period of about two hours, the paraformaldehyde has dissolved and has condensed with the polyhydroxy compounds to give acetal linkages. Vacuum is now gradually applied to the reaction mixture and the water which is formed in the condensation is distilled over at 80–90° C. in a vacuum of about 12 mm. After about 207 g. of water has been distilled out of the reaction mixture, the condensation has been completed and the water formed during the condensation has been removed. Residues of paraformaldehyde still sublime from the solution. This is the excess of paraformaldehyde and shows the condensation is complete. The condensation product is a yellow viscous oily material having an hydroxyl number of 47. If necessary, the condensation product can further be washed with hot water.

100 g. of the condensation product is thoroughly mixed with an accelerator mixture consisting of 1 g. of

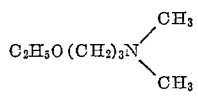

1 g. of diethyl ammonium oleate, 1 g. of a 54 aqueous solution of the sodium salt of sulphonated castor oil and 2 g. of water. This mixture is then stirred with 34 g. of toluylene diisocyanate and after mixing, placed in molds. A very soft and elastic foam material which is resistant to hydrolysis and high humidities and atmospheres and elevated temperatures is obtained having the following values:

| | | |
|---|---|---|
| Weight per unit volume | g./cm.³ | 0.032 |
| Elasticity | percent | 36 |
| Tensile strength | kg./cm.² | 0.87 |
| Breaking elongation | percent | 108 |
| Compressive strength (40% compression) | g./cm.² | 58 |

After the aging of the foam, the following mechanical values are produced:

| | | |
|---|---|---|
| Elasticity | percent | 33 |
| Tensile strength | kg./cm.² | 0.88 |
| Breaking elongation | percent | 124 |
| Compressive strength (40% compression) | g./cm.² | 58 |

*Example 2*

100 g. of a condensation product obtained according to the method of Example 1 from 1.78 kg. of 1,4-butane-β-dihydroxyethyl ether, 300 g. of castor oil, 310 g. of paraformaldehyde and 7 g. of p-toluene sulphonic acid and having an OH number of 44 are foamed in the manner indicated in Example 1. A soft elastic foam is obtained which has the following mechanical properties:

| | | |
|---|---|---|
| Weight per unit volume | g./cm.³ | 0.032 |
| Elasticity | percent | 45 |
| Notch strength | kg./cm. | 0.45 |
| Tensile strength | kg./cm.² | 1.11 |
| Breaking elongation | percent | 119 |

*Example 3*

1.78 kg. of 1,4-butane-β-dihydroxyethyl ether, 360 g. of paraformaldehyde and 6.6 g. of p-toluene sulphonic acid are condensed in the manner indicated in Example 1. In the condensation reaction 204 g. of water are formed. After the water is removed the condensation product is a yellow water-soluble viscous oil with an hydroxyl number of 47.

1 kg. of this condensation product is mixed with 500 g. of castor oil and 100 g. of toluylene diisocyanate is then added dropwise at 70–90° C. with stirring. A reaction product is formed with an increase in viscosity having a yellowish-red color and an hydroxyl number of 47.

100 g. of this condensation product is mixed by stirring in the manner indicated in Example 1 with 36 g. of toluylene diisocyanate and the activator mixture of Example 1. A polyurethane foam material is formed which has the following properties:

| | | | | |
|---|---|---|---|---|
| weight per unit volume | g./cm.³ | 0.33 | 0.034 | 0.033 |
| elasticity | percent | 36 | 40 | 37 |
| notch strength | kg./cm. | 0.39 | 0.45 | 0.29 |
| tensile strength | kg./cm.² | 0.91 | 1.01 | 0.66 |
| breaking elongation | percent | 110 | 120 | 85 |

*Example 4*

A condensation product obtained according to the method of Example 1 from 1.5 kg. of triethylene glycol, 500 g. of castor oil and 390 g. of paraformaldehyde in the presence of 6 g. of p-toluene sulphonic acid is formed. After the water is removed a reaction product having an hydroxyl number of 50 is foamed in the manner indicated in Example 1. A soft elastic polyurethane foam is formed which has the following mechanical properties:

| | | |
|---|---|---|
| Weight per unit volume | g./cm.³ | 0.042 |
| Elasticity | percent | 38 |
| Notch strength | kg./cm. | 0.52 |
| Tensile strength | kg./cm.² | 0.95 |
| Breaking elongation | percent | 112 |

The polyurethane plastics produced by the present invention can be used for making any of the products listed on page 1 of the present specification where the improved properties are desired.

It is to be understood that any of the organic compounds containing reactive hydrogen atoms or polyisocyanates or fatty acid esters or chain extenders or cross-linkers disclosed as operable herein can be substituted in the foregoing working examples for those specific compounds used.

Although the invention has been described in considerable detail in the foregoing with reference to specific embodiments thereof, such detail has been presented solely for the purpose of illustration and modifications can be made therein by those skilled in the art without departing from the spirit and scope of the invention except as is set forth in the claims.

What is claimed is:

1. A method of preparing a polyurethane plastic which comprises reacting an organic polyisocyanate with a member selected from the group consisting of (1) a polyacetal and a member selected from the group consisting of a fatty acid ester having at least two hydroxyl groups and at least ten carbon atoms and a condensate of an alkylene oxide having from two to five carbon atoms and a fatty acid ester having at least two hydroxyl groups and at least ten carbon atoms, said polyacetal having been prepared by condensation of a monomeric aldehyde and a polyhydric alcohol having a molecular weight of up to about 400; and (2) a polyacetal which has been prepared by reacting (a) a polyhydric alcohol having a molecular weight of up to about 400, (b) a monomeric aldehyde and (c) a member selected from the group consisting of a fatty acid ester having at least two hydroxyl groups and at least ten carbon atoms and a condensate of an alkylene oxide having from two to five carbon atoms and a fatty acid ester having at least two hydroxyl groups and at least ten carbon atoms.

2. A method of preparing a polyurethane plastic which comprises reacting an organic polyisocyanate with a polyacetal and a member selected from the group consisting of a fatty acid ester having at least two hydroxyl groups and at least ten carbon atoms and a condensate of an alkylene oxide having from two to five carbon atoms and a fatty acid ester having at least two hydroxyl groups and at least ten carbon atoms, said polyacetal having been prepared by condensation of a monomeric aldehyde and a polyhydric alcohol having a molecular weight of up to about 400.

3. A method of preparing a polyurethane plastic which comprises reacting an organic polyisocyanate with a polyacetal which has been prepared by reacting (a) a polyhydric alcohol having a molecular weight of up to about 400, (b) a monomeric aldehyde and (c) a member selected from the group consisting of a fatty acid ester having at least two hydroxyl groups and at least ten carbon atoms and a condensate of an alkylene oxide having from two to five carbon atoms and a fatty acid ester having at least two hydroxyl groups and at least ten carbon atoms.

4. A method of preparing a cellular polyurethane plastic which comprises reacting an excess of an organic polyisocyanate with water and a polyacetal and a member selected from the group consisting of a fatty acid ester having at least two hydroxyl groups and at least ten carbon atoms and a condensate of an alkylene oxide having from two to five carbon atoms and a fatty acid ester having at least two hydroxyl groups and at least ten carbon atoms, said polyacetal having been prepared by condensation of a monomeric aldehyde and a polyhydric alcohol having a molecular weight of up to about 400.

5. A method of preparing a cellular polyurethane plastic which comprises reacting an excess of an organic polyisocyanate with water and a polyacetal which has been prepared by reacting (a) a polyhydric alcohol having a molecular weight of up to about 400, (b) a monomeric aldehyde and (c) a member selected from the group consisting of a fatty acid ester having at least two hydroxyl groups and at least ten carbon atoms and a condensate of an alkylene oxide having from two to five carbon atoms and a fatty acid ester having at least two hydroxyl groups and at least ten carbon atoms.

6. The process of claim 5 wherein the water, organic polyisocyanate and polyacetal are all mixed together substantially simultaneously.

7. A method of preparing a polyurethane plastic which comprises reacting an organic polyisocyanate with a polyacetal and a member selected from the group consisting of a fatty acid ester having at least two hydroxyl groups and at least ten carbon atoms and a condensate of an alkylene oxide having from two to five carbon atoms and a fatty acid ester having at least two hydroxyl groups and at least ten carbon atoms, said polyacetal having been prepared by condensation of formaldehyde and a polyhydric alcohol having molecular weight of up to about 400.

8. A method of preparing a cellular polyurethane plastic which comprises reacting an excess of an organic polyisocyanate with water, castor oil and a polyacetal prepared by condensation of formaldehyde and a polyhydric alcohol having a molecular weight of up to about 400.

9. A method of preparing a cellular polyurethane plastic which comprises reacting an excess of an organic polyisocyanate with water and a polyacetal which has been prepared by reaction of a polyhydric alcohol having a molecular weight of up to about 400, formaldehyde and castor oil.

10. A method of preparing a polyurethane plastic which comprises reacting an organic polyisocyanate with (1) a condensate of an alkylene oxide having from two to five carbon atoms and castor oil and (2) a polyacetal prepared by condensation of a monomeric aldehyde and a polyhydric alcohol having a molecular weight of up to about 400.

11. A method of preparing a polyurethane plastic which comprises reacting an organic polyisocyanate with a polyacetal which has been prepared by condensation of a monomeric aldehyde, a polyhydric alcohol having a molecular weight of up to about 400 and a condensate of an alkylene oxide having from two to five carbon atoms and castor oil.

References Cited in the file of this patent

UNITED STATES PATENTS

| | | |
|---|---|---|
| 2,005,499 | Hill | June 18, 1935 |
| 2,277,083 | Dorough | Mar. 24, 1942 |
| 2,591,884 | Simon et al. | Apr. 8, 1952 |
| 2,668,153 | Hammon | Feb. 2, 1954 |
| 2,676,157 | Newell | Apr. 20, 1954 |

FOREIGN PATENTS

| | | |
|---|---|---|
| 768,192 | Great Britain | Feb. 13, 1957 |
| 956,556 | France | Aug. 15, 1949 |
| 838,827 | Germany | May 12, 1952 |

UNITED STATES PATENT OFFICE
CERTIFICATE OF CORRECTION

Patent No. 3,021,289                               February 13, 1962

Erwin Müller et al.

It is hereby certified that error appears in the above numbered patent requiring correction and that the said Letters Patent should read as corrected below.

Column 2, line 21, for "ar" read -- are --; line 38, the formula should appear as shown below instead of as in the patent:

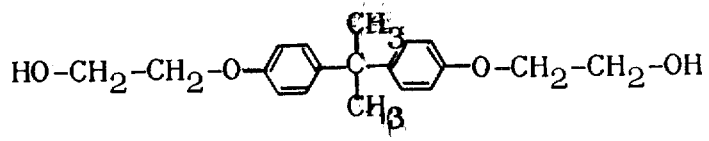

column 3, line 7, for "wth" read -- with --; column 4, line 67, for "ester" read -- ether --.

Signed and sealed this 2nd day of July 1963.

(SEAL)
Attest:

ERNEST W. SWIDER
Attesting Officer

DAVID L. LADD
Commissioner of Patents